US011995540B2

(12) United States Patent
Kajino et al.

(10) Patent No.: US 11,995,540 B2
(45) Date of Patent: May 28, 2024

(54) ONLINE LEARNING FOR DYNAMIC BOLTZMANN MACHINES WITH HIDDEN UNITS

(71) Applicant: INTERNATIONAL BUSINESS MACHINES CORPORATION, Armonk, NY (US)

(72) Inventors: Hiroshi Kajino, Tokyo (JP); Takayuki Osogami, Kanagawa-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 988 days.

(21) Appl. No.: 16/157,455

(22) Filed: Oct. 11, 2018

(65) Prior Publication Data

US 2020/0117987 A1    Apr. 16, 2020

(51) Int. Cl.
*G06N 3/08* (2023.01)
*G06N 3/044* (2023.01)
*G06N 3/047* (2023.01)

(52) U.S. Cl.
CPC ............... *G06N 3/08* (2013.01); *G06N 3/044* (2023.01); *G06N 3/047* (2023.01)

(58) Field of Classification Search
CPC ....... G06N 3/08; G06N 3/0445; G06N 3/0472
See application file for complete search history.

(56) References Cited

U.S. PATENT DOCUMENTS

| 2015/0227849 A1* | 8/2015 | Jaros ...................... G06N 3/045 706/12 |
| 2016/0092767 A1 | 3/2016 | Osogami et al. |

(Continued)

FOREIGN PATENT DOCUMENTS

| CN | 107634911 | * | 1/2018 |
| CN | 107634911 A | * | 1/2018 |

OTHER PUBLICATIONS

Sutskever, I., et al. "The recurrent temporal restricted Boltzmann machine." In Advances in Neural Information Processing Systems 21, pp. 1601-1608. (Year: 2008).*

(Continued)

*Primary Examiner* — Michael J Huntley
*Assistant Examiner* — Adam C Standke
(74) *Attorney, Agent, or Firm* — Tutunjian & Bitetto, P.C.; Robert Richard Aragona

(57) ABSTRACT

A computer-implemented method, a computer program product, and a computer processing system are provided for online learning for a Dynamic Boltzmann Machine (DyBM) with hidden units. The method includes imposing, by a processor device, limited connections in the DyBM where (i) a current observation $x^{[t]}$ depends only on latest hidden units $h^{[t-1/2]}$ and all previous observations $x^{[<t]}$ and (ii) the latest hidden units $h^{[t-1/2]}$ depend on all the previous observations $x^{[<t]}$ while being independent of older hidden units $h^{[t-1/2]}$. The method further includes computing, by the processor device, gradients of an objective function. The method also includes optimizing, by the processor device, the objective function in polynomial time using a stochastic Gradient Descent algorithm applied to the gradients.

20 Claims, 7 Drawing Sheets

(56) References Cited

U.S. PATENT DOCUMENTS

2018/0173579 A1* 6/2018 Potlapally ........... G06F 11/0772
2018/0197080 A1   7/2018 Kajino et al.

OTHER PUBLICATIONS

34th International Conference on Machine Learning (ICML 2017): Sydney, Australia Aug. 6-11, 2017. (2017) https://media.nips.cc/Conferences/ICML2017/ICML-2017-Conference-Book.pdf. See p. 42 for exact date of reference "Bidirectional learning for time-series models with hidden units." (Year: 2017).*

Sebastian Ruder. (Mar. 20, 2020). An overview of gradient descent optimization algorithms. Sebastian Ruder. Retrieved Mar. 23, 2022, from https://ruder.io/optimizing-gradient-descent/index.html#fn10 (Year: 2020).*

Sohn, Kihyuk, et al. "Efficient learning of sparse, distributed, convolutional feature representations for object recognition." 2011 International Conference on Computer Vision. IEEE, (Year: 2011).*

Takayuki, et al. "Bidirectional learning for time-series models with hidden units." International Conference on Machine Learning. PMLR (Year: 2017).*

Sutskever, et al. "The recurrent temporal restricted Boltzmann machine." In Advances in Neural Information Processing Systems 21,pp. 1601-1608. (Year: 2008).*

34th International Conference on Machine Learning(ICML2017):Sydney,Australia Aug. 6-11, 2017.(2017)https://media.nips.cc/Conferences/ICML2017/ICML-2017-Conference-Book.pdf.Seepage42forexactdateofreference"Bidirectionallearningfortime-series models with hidden units." (Year: 2017).*

Osogami T.Boltzmann machines for time-series. arXivpreprintarXiv:1708.06004 (Year: 2017).*

Sebastian Ruder.(Mar. 20, 2020).An overview of gradient descent optimization algorithms.SebastianRuder.Retrieved Mar. 23, 2022,from httos://ruder.io/optimizing-gradient-descent/index.html#fn10 (Year: 2020).*

Sohn, Kihyuk,et al."Efficient learning of sparse,distriouted,convolutional feature representations for object recognition." 2011 International Conference on Computer Vision. IEEE, (Year: 2011).*

Tayloretal.,"Modeling human motion using binary latent variables. " Advances in neural information processing systems 19 (Year: 2006).*

Duchi,John,Elad Hazan,and Yoram Singer."Adaptive sub gradient methods for online learning and stochastic optimization." Journal of machine learning research12.7 (Year: 2011).*

Cherla, et al."Discriminative learning and inference in the Recurrent Temporal RBM for melody modelling." 2015 International Joint Conference on Neural Networks(IJCNN).IEEE (Year: 2015).*

Dasgupta et al., "Regularized Dynamic Boltzmann Machine withDelay Pruning for Unsupervised Learning of Temporal Sequences", arXiv:1610.01989v1 [cs.LG] Sep. 22, 2016, 6 pages.

Dasgupta et al., "Nonlinear Dynamic Boltzmann Machines for Time-series Prediction", IBM Research Report, Computer Science; Mathematics, Nov. 2016, 12 pages.

Osogami, Takayuki, "Boltzmann Machines for Time-Series", arXiv:1708.06004v2 [cs.NE] Sep. 22, 2017, pp. 1-33.

* cited by examiner

US 11,995,540 B2

ONLINE LEARNING FOR DYNAMIC BOLTZMANN MACHINES WITH HIDDEN UNITS

BACKGROUND

Technical Field

The present invention generally relates to machine learning, and more particularly to online learning for dynamic Boltzmann machines with hidden units.

Description of the Related Art

A Boltzmann machine is a type of Neural Network (NN). Boltzmann machines with unconstrained connectivity have not proven useful for practical problems in machine learning or inference, but if the connectivity is properly constrained, the learning can be made efficient enough to be useful for practical problems.

One conventional technique using a Boltzmann machine presents a quasi-online learning algorithm for a dynamic Boltzmann machine (DyBM) equipped with hidden units. It has two limitations as follows: bidirectional training; and variance of gradient estimation.

Bidirectional training: The conventional technique requires bidirectional training, where both the forward and backward models have to be trained, and the backward model requires the time-reversal time series. Therefore, it is necessary to store all the previous data during the training period.

Variance of gradient estimation: The conventional technique employs a Monte Carlo estimator for gradients, i.e., summation over all possible configurations of hidden units is approximated by sampling. The variance caused by sampling will slow down learning.

Hence, there is a need for a technique that uses a Boltzmann machine capable of overcoming the aforementioned deficiencies.

SUMMARY

According to an aspect of the present invention, a computer-implemented method is provided for online learning for a Dynamic Boltzmann Machine (DyBM) with hidden units. The method includes imposing, by a processor device, limited connections in the DyBM where (i) a current observation $x^{[t]}$ depends only on latest hidden units $h^{[t-1/2]}$ and all previous observations $x^{[<t]}$ and (ii) the latest hidden units $h^{[t-1/2]}$ depend on all the previous observations $x^{[<t]}$ while being independent of older hidden units $h^{[<t-1/2]}$. The method further includes computing, by the processor device, gradients of an objective function. The method also includes optimizing, by the processor device, the objective function in polynomial time using a stochastic Gradient Descent algorithm applied to the gradients.

According to another aspect of the present invention, a computer program product is provided for online learning for a Dynamic Boltzmann Machine (DyBM) with hidden units. The computer program product includes a non-transitory computer readable storage medium having program instructions embodied therewith. The program instructions are executable by a computer to cause the computer to perform a method. The method includes imposing, by a processor device, limited connections in the DyBM where (i) a current observation $x^{[t]}$ depends only on latest hidden units $h^{[t-1/2]}$ and all previous observations $x^{[<t]}$ and (ii) the latest hidden units $h^{[<t-1/2]}$ depend on all the previous observations $x^{[<t]}$ while being independent of older hidden units $h^{[<t-1/2]}$. The method further includes computing, by the processor device, gradients of an objective function. The method also includes optimizing, by the processor device, the objective function in polynomial time using a stochastic Gradient Descent algorithm applied to the gradients.

According to yet another aspect of the present invention, a computer processing system is provided for online learning for a Dynamic Boltzmann Machine (DyBM) with hidden units. The system includes a memory for storing program code. The system further includes a processor device for running the program code to impose limited connections in the DyBM where (i) a current observation $x^{[t]}$ depends only on latest hidden units $h^{[<t-1/2]}$ and all previous observations $x^{[<t]}$ and (ii) the latest hidden units $h^{[<t-1/2]}$ depend on all the previous observations $x^{[<t]}$ while being independent of older hidden units $h^{[<t-1/2]}$. The processor further runs the program code to compute gradients of an objective function. The processor also runs the program code to optimize the objective function in polynomial time using a stochastic Gradient Descent algorithm applied to the gradients.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to online learning for dynamic Boltzmann machines (DyBMs) with hidden units.

In an embodiment, the present invention is directed to an online learning algorithm for a subclass of DyBMs with hidden units that overcomes the aforementioned limitations directed to bidirectional training and variance of gradient estimation suffered by conventional techniques involving such DyBMs.

In an embodiment, a fundamental idea of the present invention is to limit the connections in the resultant DyBM model. More specifically, in an embodiment, a current observation x[t] depends only on the latest hidden units, h[t-1/2], as well as all the previous observations x[<t]. Hidden units h[t-1/2] depend on all the previous observations x[<t], while being independent of older hidden units h[<t-1/2]. This model allows us to derive polynomial time algorithms to compute gradients of a lower-bound of the log-likelihood function with respect to all of the model parameters, thus addressing the aforementioned two limitations of bidirectional training and variance of gradient estimation suffered by conventional techniques.

In an embodiment, the present invention can provide the following advantages/features: (i) unidirectional training; (ii) exact calculation of gradients of a lower-bound of the log-likelihood function in polynomial time; and (iii) hidden units serving as a non-linear transformation of previous observations, which can improve model performance. These and other advantages/features of the present invention are readily determined by one of ordinary skill in the art given the teachings of the present invention provided herein, while maintaining the spirit of the present invention.

The present invention exploits the fact that a DyBM has the property that its parameters can be trained to maximize the log likelihood of given sequential data through stochastic gradient descent methods under suitable assumptions.

Figure 1:
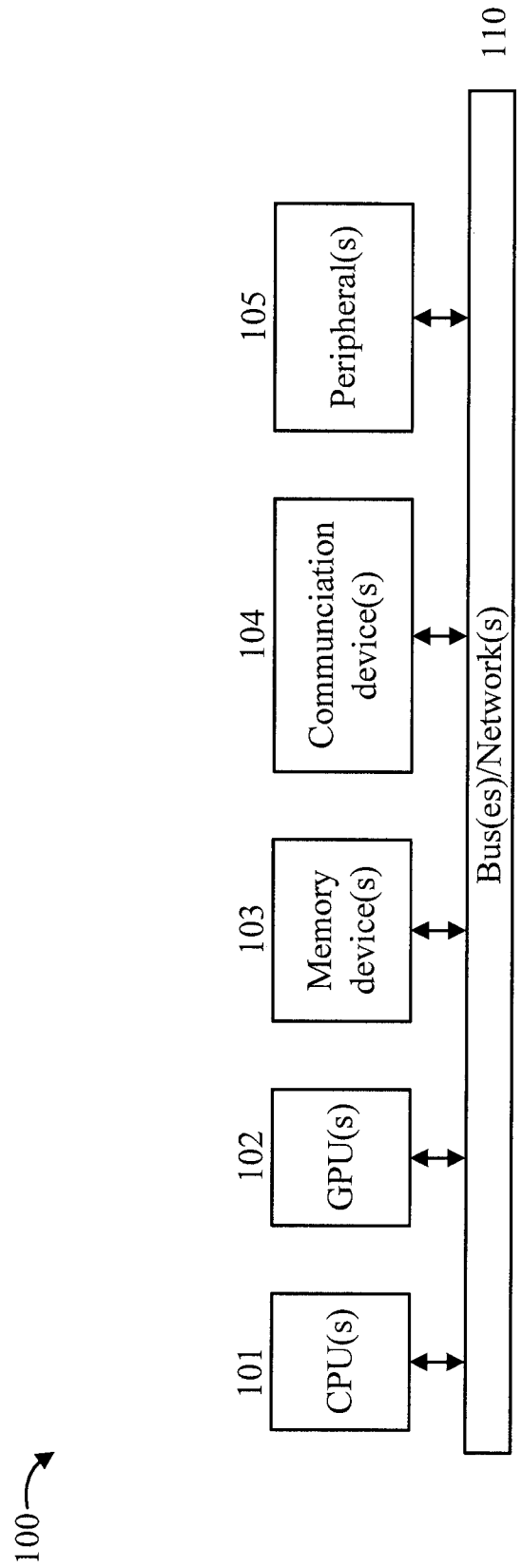
FIG. 1 is a block diagram showing an exemplary processing system 100 to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A description will now be given regarding two exemplary environments 200 and 300 to which the present invention can be applied, in accordance with various embodiments of the present invention. The environments 200 and 300 are described below with respect to FIGS. 2 and 3, respectively. In further detail, the environment 200 includes an online learning system (for dynamic Boltzmann machines with hidden units) operatively coupled to a controlled system, while the environment 300 includes an online learning system (for dynamic Boltzmann machines with hidden units) as part of a controlled system. Moreover, any of environments 200 and 300 can be part of a cloud-based environment (e.g., see FIGS. 6-7). These and other environments to which the present invention can be applied are readily determined by one of ordinary skill in the art, given the teachings of the present invention provided herein, while maintaining the spirit of the present invention.

Figure 2:
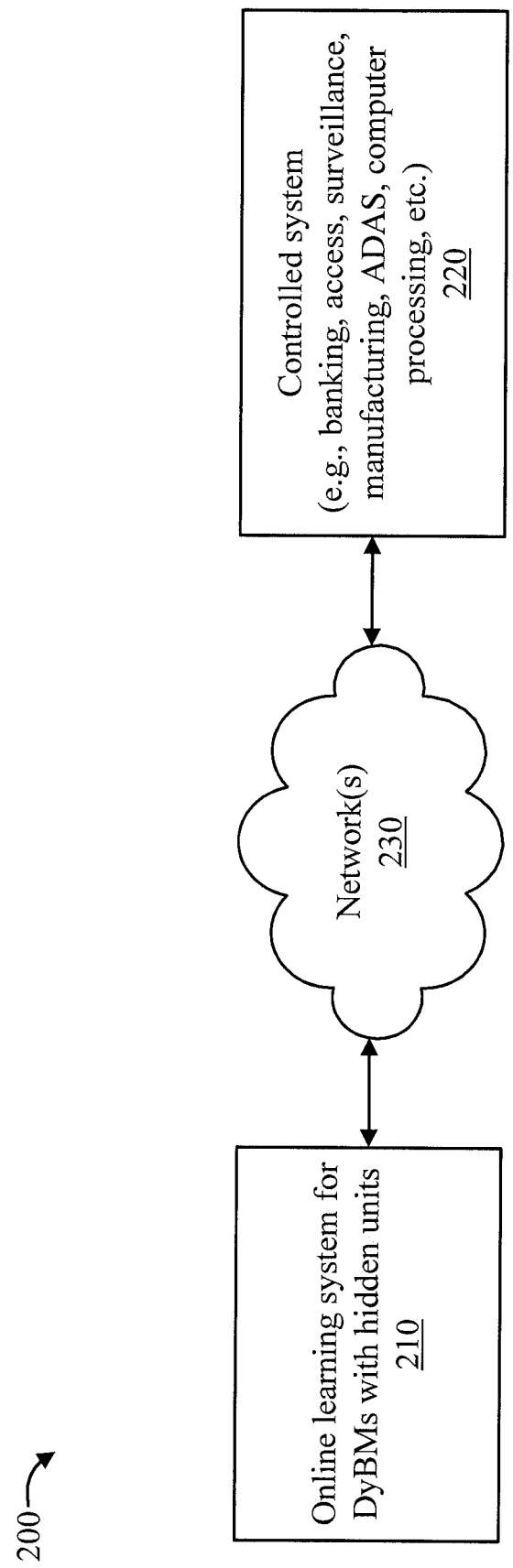
FIG. 2 is a block diagram showing an exemplary environment 200 to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a controlled system 220 and an online learning system for dynamic Boltzmann machines with hidden units (hereinafter "online DyBM learning system" in short) 210. The online learning system 210 and the controlled system 220 are configured to enable communications therebetween. For example, transceivers and/or other types of communication devices including wireless, wired, and combinations thereof can be used. In an embodiment, communication between the online learning system 210 and the controlled system 220 can be performed over one or more networks, collectively denoted by the figure reference numeral 230. The communication can include, but is not limited to, multi-variate time series data or other data from the controlled system 220, and predictions and action initiation control signals from the online learning system 210. The controlled system 220 can be any type of processor-based system such as, for example, but not limited to, a banking system, an access system, a surveillance system, a manufacturing system (e.g., an assembly line), an Advanced Driver-Assistance System (ADAS), and so forth.

The controlled system 220 provides data (e.g., time-series data or other data) to the online learning system 210 which uses the data for learning and to make predictions (forecasts). The online learning system 210 uses past observations to make a forecast (prediction) of a future event. The usage of past observations is made with respect to particular rules for determining dependence between observations and hidden units to be used.

A DyBM includes a network of neurons and memory units. A pre-synaptic neuron is connected to a post-synaptic neuron via a FIFO queue. The spike from the pre-synaptic neuron reaches the post-synaptic neuron after a constant conduction delay. Each neuron has the memory unit for storing neural eligibility traces, which summarize the neuron's activities in the past. A synaptic eligibility trace is associated with a synapse between a pre-synaptic neuron and a post-synaptic neuron, and summarizes the spikes that have arrived at the synapse, via the FIFO queue, from the pre-synaptic neuron.

Hence, the DyBM can be viewed as fully-connected recurrent neural network with memory units and with conduction delays between units implemented in the form of fixed length first-in first-out (FIFO) queues. A spike originating at a pre-synaptic neuron (unit) travels along this FIFO queue and reaches the post-synaptic neuron after a fixed delay. The length of the FIFO queues is equal to one minus the maximum delay value.

In general, the DyBM is designed for learning temporal pattern sequences.

In an embodiment, in order to make a prediction, limited connections are imposed on the DyBM such that a current observation x[t] depends only on the latest hidden units, h[t-1/2], as well as all the previous observations x[<t]. Hidden units h[t-1/2] depend on all the previous observations x[<t], while being independent of older hidden units h[<t-1/2]. This model allows us to derive polynomial time algorithms to compute the exact gradients with respect to all of the model parameters, thus addressing the aforementioned two limitations of bidirectional training and variance of gradient estimation suffered by conventional techniques.

The controlled system 220 can be controlled based on a prediction generated by the online learning system 210. For example, based on a forecast that a machine will fail in x time steps, a corresponding action (e.g., power down machine, enable machine safeguard to prevent injury/etc., and/or so forth) can be performed at t<x in order to avoid the failure from actually occurring. As another example, based on a trajectory of an intruder, a surveillance system being controlled could lock or unlock one or more doors in order to secure someone in a certain place (holding area) and/or guide them to a safe place (safe room) and/or restrict them from a restricted place and/or so forth. Verbal (from a speaker) or displayed (on a display device) instructions could be provided along with the locking and/or unlocking of doors (or other actions) in order to guide a person. As a further example, a vehicle can be controlled (braking, steering, accelerating, and so forth) to avoid an obstacle that is predicted to be in a car's way responsive to a DyBM prediction. As a yet further example, the present invention can be incorporated into a computer system in order to forecast impending failures and take action before the failures occur, such as switching a component that will soon fail with another component, routing through a different component, processing by a different component, and so forth. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the online learning system 210 can be implemented as a node in a cloud-computing arrangement. In an embodiment, a single online learning system 210 can be assigned to a single controlled system or to multiple controlled systems e.g., different robots in an assembly line, and so forth). These and other configurations of the elements of environment 200 are readily determined by one of ordinary skill in the art given the teachings of the present invention provided herein, while maintaining the spirit of the present invention.

Figure 3:
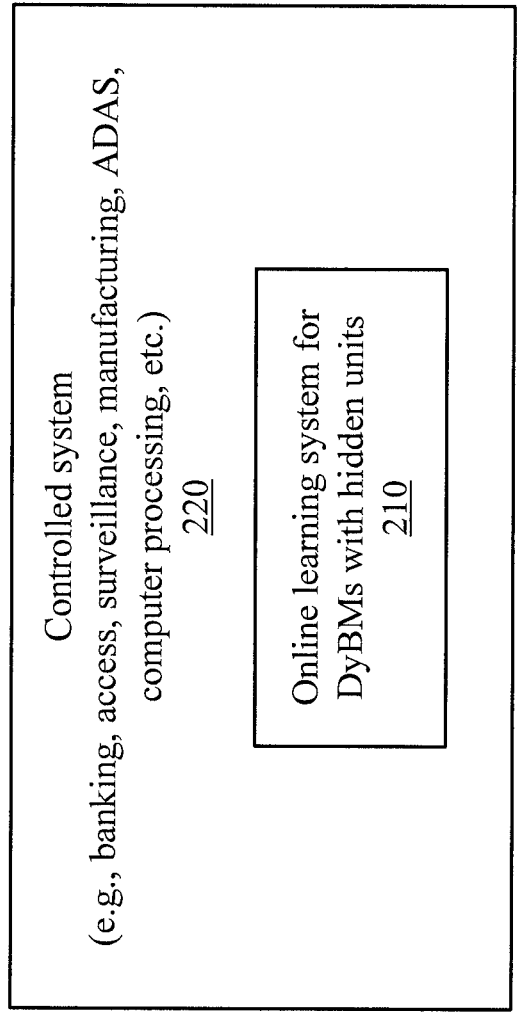
FIG. 3 is a block diagram showing another exemplary environment 300 to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a controlled system 320 that, in turn, includes an online learning system for dynamic Boltzmann machines with hidden units (hereinafter "online DyBM learning system" in short) 210. One or more communication buses and/or other devices can be used to facilitate inter-system, as well as intra-system, communication. The controlled system 320 can be any type of processor-based system such as, for example, but not limited to, a banking system, an access system, a surveillance system, a manufacturing system (e.g., an assembly line), an Advanced Driver-Assistance System (ADAS), computer processing, and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

Figure 4:
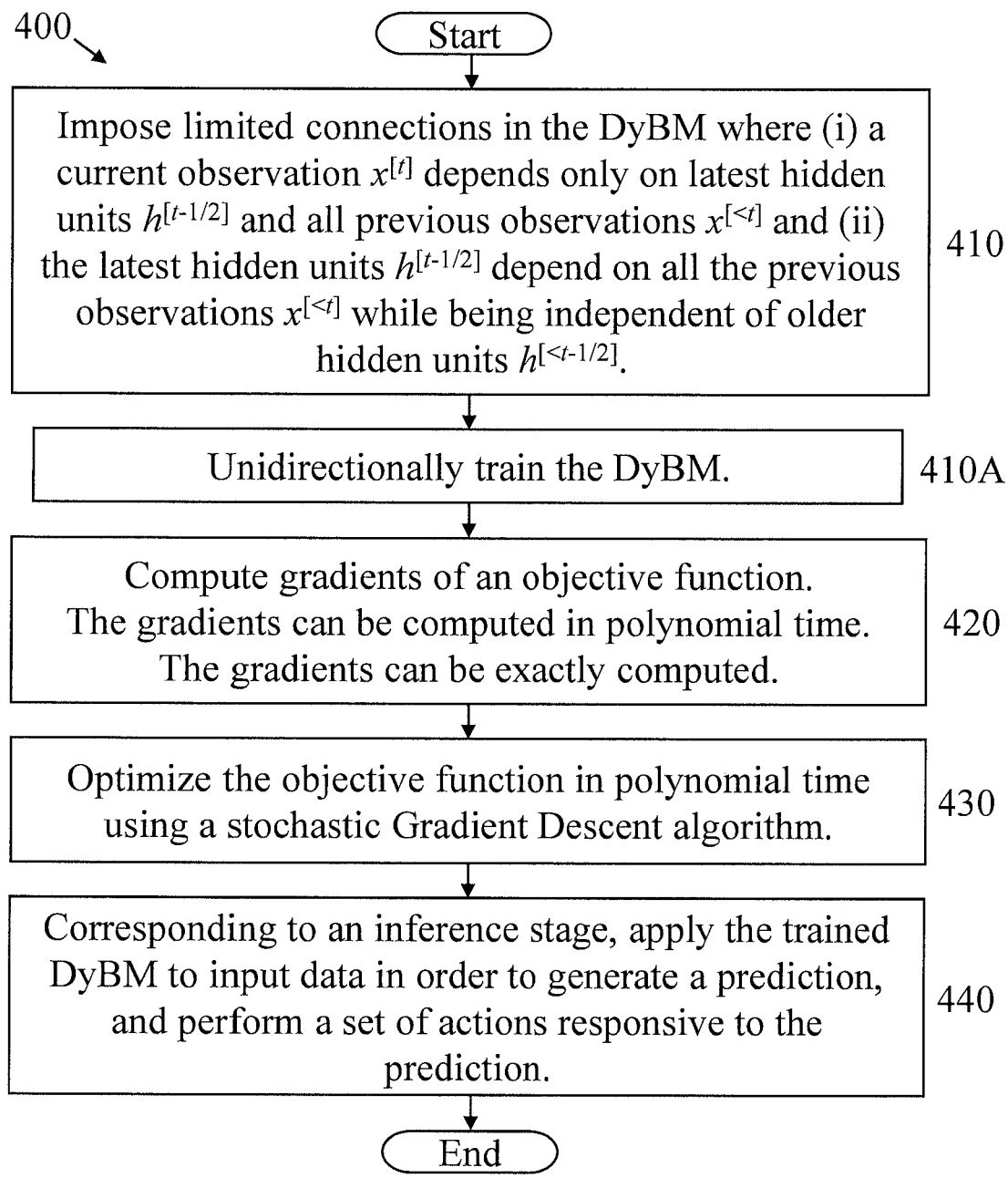
FIG. 4 is a flow diagram showing an exemplary method for online learning for Dynamic Boltzmann Machines with hidden units, in accordance with an embodiment of the present invention.

FIG. 4 is a flow diagram showing an exemplary method for online learning for Dynamic Boltzmann Machines with hidden units, in accordance with an embodiment of the present invention.

At block 410, impose limited connections in the DyBM where (i) a current observation $x^{[t]}$ depends only on latest hidden units $h^{[t-1/2]}$ and all previous observations $x^{[<t]}$ and (ii) the latest hidden units $h^{[t-1/2]}$ depend on all the previous observations $x^{[<t]}$ while being independent of older hidden units $h^{[<t-1/2]}$. Accordingly, the latest units $h^{[t-1/2]}$ are employed as a non-linear transformation of the previous observations.

In an embodiment, block 410 can include block 410A.

At block 410A, unidirectionally train the DyBM.

At block 420, compute gradients of an objective function.

In an embodiment, the gradients of the objective function are computed in polynomial time. In this way, gradient computation is optimized and efficient.

In an embodiment, the gradients of the objective function are exactly calculated versus being estimated. In this way, model performance is improved.

At block 430, optimize the objective function in polynomial time using a stochastic Gradient Descent algorithm. The DyBM can now be considered to be trained.

At block 440, corresponding to an inference stage, apply the trained DyBM to input data in order to generate a prediction, and perform a set of actions responsive to the prediction. As appreciated by one of ordinary skill in the art, the set of actions depends on the implementation. For example, depending upon the type of the controlled system, the action will vary from system type to system type, and so forth. Exemplary actions are described above with respect to FIG. 2.

Figure 5:
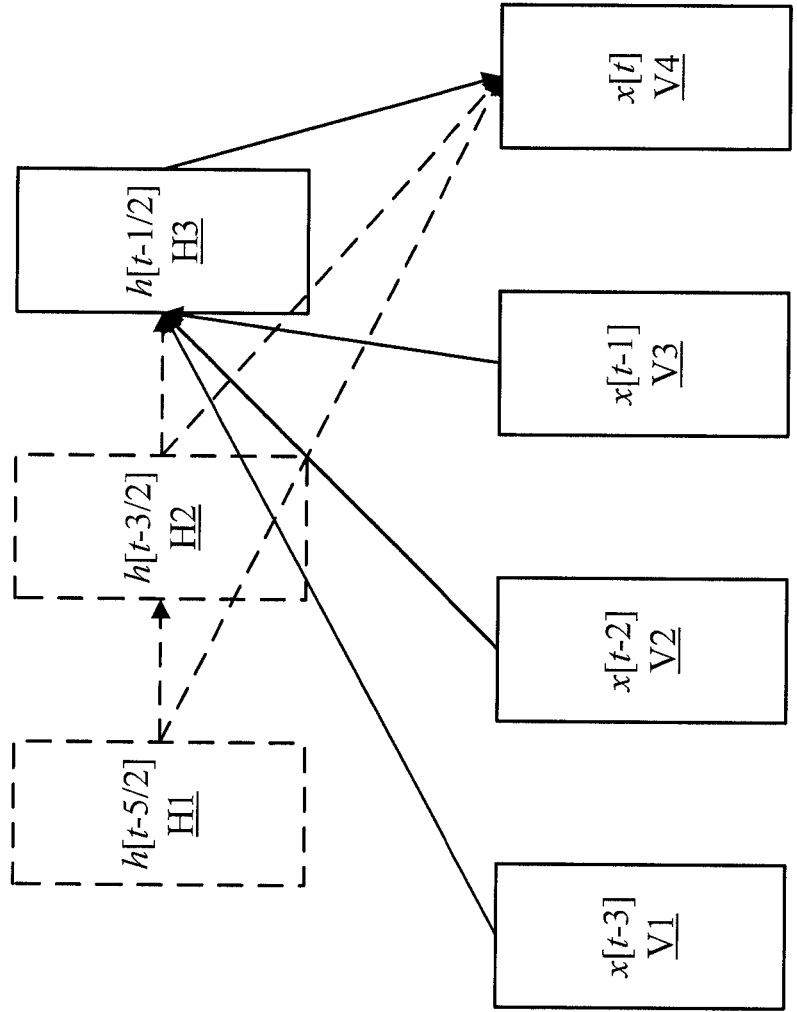
FIG. 5 is a block diagram showing an exemplary DyBM 500, in accordance with an embodiment of the present invention.

FIG. 5 is a block diagram showing an exemplary DyBM 500, in accordance with an embodiment of the present invention.

The DyBM 500 includes visible units (V1-V4) denoted by an x, hidden units (H1-H3) denoted by an h, and connections between units denoted by arrows. Any of the preceding mentioned objects (i.e., visible units, hidden units, and connections) shown using dashed lines are units or connections that are removed by the present invention, thus resulting in limited connections. Hence, in the preceding example, hidden units H1 and H2 and the connections shown using dashed lines have been "removed" in accordance with an embodiment of the present invention. In this way, the connections are limited, thus overcoming the aforementioned deficiencies of the prior art.

In an embodiment, a polynomial-time online learning algorithm is provided for a subclass of DyBMs with hidden units.

A model represented by the DyBMs can be as follows:

$$p(x^{[t]} \mid x^{[<t]}) = \sum_{h^{[t-\frac{1}{2}]}} p(x^{[t]} \mid x^{[<t]}, h^{[t-\frac{1}{2}]}) p(h^{[t-\frac{1}{2}]} \mid x^{[<t]}).$$

The preceding model has limited connections as compared to conventional models such as those corresponding to the aforementioned conventional approach. The DyBM of the present invention uses a learning rule that maximizes a log likelihood of given patterns exhibiting a key property of Hebb's rule, i.e., co-activated neural units should be connected.

In an embodiment, the objective function for maximizing the log likelihood can be implemented using a lower bound of the log-likelihood as follows:

$$\mathcal{L}^{[t]}(\theta, \phi) := \sum_{h^{[t-\frac{1}{2}]}} p_\phi(h^{[t-\frac{1}{2}]} \mid x^{[<t]}) \log(p_\theta(x^{[t]} \mid x^{[<t]}, h^{[t-\frac{1}{2}]})),$$

where Ø denotes the weight parameters from the visible units to the hidden units, and θ denotes the other weight parameters.

The present invention can be used in a polynomial time online learning algorithm as follows. Gradients of the objective function can be computed in polynomial time due to the limited connections. Exemplary expressions relating to the limited connections are described hereinbelow.

Hence, in an embodiment, one or more Stochastic Gradient Descent (GSD) algorithms can optimize the objective function in polynomial time.

A description will now be given regarding a comparison of the present invention to conventional approaches/structures for online learning. Such conventional methods/structures include a linear DyBM, a RNN Gaussian DyBM, and a bidirectional DyBM.

In comparing the present invention versus Linear DyBM (the most standard DyBM), the following applies:
Pros: High predictive performance.
Cons: Additional computational costs; additional hyperparameters.

In comparing the present invention versus RNN Gaussian DyBM (Linear DyBM+Non-linearity), the following applies:
Pros: Memory in hidden units, which leads to better performance.
Cons: Additional computation costs; additional hyperparameters.

In comparing the present invention versus Bidirectional DyBM (Linear DyBM+hidden units), the following applies:
Pros: Unidirectional learning (i.e., each observation can be discarded after being used for parameter update).
Cons: Strictly limited expressive power In support of the concepts of the present invention, the following mathematical notations apply:

$[\![A, x]\!] = x^T A x.$ $\langle x, y \rangle = x^T y.$

For a square matrix $$A \in \mathbb{R}^{N \times N}, \operatorname{diag}(A) = \begin{bmatrix} A_{1,1} & & O \\ & \ddots & \\ O & & A_{N,N} \end{bmatrix},$$

and a vector v $$\in \mathbb{R}^N, \operatorname{diag}(v) = \begin{bmatrix} v_1 & & O \\ & \ddots & \\ O & & v_N \end{bmatrix}.$$

For a function $f: \mathbb{R} \to \mathbb{R}$ and a vector $v \in \mathbb{R}^N$, $f(v) = [f(v_1) \ldots f(v_N)]^T$ (broadcasting rule). The broadcasting rule allows for a set of rules for applying binary universal functions (e.g., addition, subtraction, multiplication, etc.). Herein, the term ° represents the element-wise multiplications of vectors and matrices.

A description will now be given regarding a model to which the present invention can be applied, in accordance with an embodiment of the present invention.

For example, in an embodiment, a model in accordance with an embodiment of the present invention can be implemented as follows:

$$p_\theta(x^{[t]} \mid x^{[<t]}, h^{[t-\frac{1}{2}]}) = \mathcal{N}(x^{[t]}; \mu^{[t]}, \Sigma),$$

where $$\mu^{[t]} = b + \sum_{\delta=1}^{d-1} W^{[\delta]} x^{[t-\delta]} + W^{[d]} \alpha^{[t-1]} + V h^{[t-\frac{1}{2}]}$$

and $$\alpha^{[t-1]} = \sum_{\delta=d}^{\infty} \lambda^{\delta-d} x^{[t-\delta]}$$

$$p_\phi(h^{[t-\frac{1}{2}]} \mid x^{[<t]}) = \frac{\exp\left[\langle h^{[t-\frac{1}{2}]}, c \rangle + \sum_{\delta=1}^{d-1} \langle h^{[t-\frac{1}{2}]}, U^{[\delta]} x^{[t-\delta]} \rangle + \langle h^{[t-\frac{1}{2}]}, U^{[d]} \alpha^{[t-1]} \rangle\right]}{Z} =$$

$$\frac{\exp(\langle h^{[t-\frac{1}{2}]}, \tilde{u}^{[t-1]} \rangle)}{Z} = \prod_{m=1}^{M} \left[\sigma(\tilde{u}_m^{[t-1]})^{h_m^{[t-\frac{1}{2}]}} (1 - \sigma(\tilde{u}_m^{[t-1]}))^{1-h_m^{[t-\frac{1}{2}]}}\right]$$

where $$\tilde{u}^{[t-1]} = c + \sum_{\delta=1}^{d-1} U^{[\delta]} x^{[t-\delta]} + U^{[d]} \alpha^{[t-1]}$$

A description will now be given regarding an objective function, in accordance with an embodiment of the present invention.

For example, in an embodiment, an objective function in accordance with an embodiment of the present invention can be implemented as follows:

$$\mathcal{L}^{[t]}(\theta, \phi) = -\frac{N}{2}\log(2\pi) - \frac{1}{2}\log|\Sigma| - \frac{1}{2}[\![\Sigma^{-1}, \tilde{x}^{[t]}]\!] +$$
$$\langle V^T \Sigma^{-1} \tilde{x}^{[t]}, \sigma(\tilde{u}^{[t-1]}) \rangle - \frac{1}{2}[\![V^T \Sigma^{-1} V, \sigma(\tilde{u}^{[t-1]})]\!] -$$
$$\frac{1}{2}\langle \sigma(\tilde{u}^{[t-1]}), \operatorname{diag}(V^T \Sigma^{-1} V)(1 - \sigma(\tilde{u}^{[t-1]})) \rangle$$

where

-continued $$\tilde{x}^{[t]} := x^{[t]} - b - \sum_{\delta=1}^{d-1} W^{[\delta]} x^{[t-\delta]} - W^{[d]} \alpha^{[t-1]}$$

A description will now be given regarding gradients, in accordance with an embodiment of the present invention.

The following gradients can be used to implement an embodiment of the present invention:

$$\nabla_b \mathcal{L}^{[t]}(\theta, \phi) = \sum\nolimits^{-1} [x^{[t]} - \mathbb{E}[\mu^{[t]}]],$$

$$\nabla_{W^{[\delta]}} \mathcal{L}^{[t]}(\theta, \phi) = \nabla_b \mathcal{L}^{[t]}(\theta, \phi) \otimes x^{[t-\delta]},$$

$$\nabla_{W^{[d]}} \mathcal{L}^{[t]}(\theta, \phi) = \nabla_b \mathcal{L}^{[t]}(\theta, \phi) \otimes \alpha^{[t-1]},$$

$$\nabla_V \mathcal{L}^{[t]}(\theta, \phi) = \sum\nolimits^{-1} [\tilde{x}^{[t]} \otimes \sigma(\tilde{u}^{[t-1]}) -$$

$$V(\sigma(\tilde{u}^{[t-1]}) \otimes \sigma(\tilde{u}^{[t-1]}) + \text{diag}(\sigma(\tilde{u}^{[t-1]}) \circ (1 - \sigma(\tilde{u}^{[t-1]}))))]$$

$$\nabla_{U^{[\delta]}} \mathcal{L}^{[t]}(\theta, \phi) = \left[ \nabla_{u_1^{[\delta]}} \mathcal{L}^{[t]}(\theta, \phi) \ \ldots \ \nabla_{u_m^{[\delta]}} \mathcal{L}^{[t]}(\theta, \phi) \right] =$$

$$\begin{cases} x^{[t-\delta]} \left[ \frac{\partial}{\partial \tilde{u}_1^{[t-1]}} \mathcal{L}^{[t]}(\theta, \phi) \ \ldots \ \frac{\partial}{\partial \tilde{u}_M^{[t-1]}} \mathcal{L}^{[t]}(\theta, \phi) \right] & (\delta = 1, \ldots d-1) \\ \alpha^{[t-2]} \left[ \frac{\partial}{\partial \tilde{u}_1^{[t-1]}} \mathcal{L}^{[t]}(\theta, \phi) \ \ldots \ \frac{\partial}{\partial \tilde{u}_M^{[t-1]}} \mathcal{L}^{[t]}(\theta, \phi) \right] & (\delta = d) \end{cases}$$

$$\nabla_c \mathcal{L}^{[t]}(\theta, \phi) = \left[ \frac{\partial}{\partial \tilde{u}_1^{[t-1]}} \mathcal{L}^{[t]}(\theta, \phi) \ \ldots \ \frac{\partial}{\partial \tilde{u}_M^{[t-1]}} \mathcal{L}^{[t]}(\theta, \phi) \right]^T$$

where $$\left[ \frac{\partial}{\partial \tilde{u}_1^{[t-1]}} \mathcal{L}^{[t]}(\theta, \phi) \ \ldots \ \frac{\partial}{\partial \tilde{u}_M^{[t-1]}} \mathcal{L}^{[t]}(\theta, \phi) \right]^T =$$

$$\sigma(\tilde{u}^{[t-1]}) \circ (1 - \sigma(\tilde{u}^{[t-1]})) \circ \left[ V^T \sum\nolimits^{-1} \tilde{x}^{[t]} - \right.$$

$$\left. V^T \sum\nolimits^{-1} V(\tilde{u}^{[t-1]}) - \text{diag}\left( V^T \sum\nolimits^{-1} V \right) \left( \frac{1}{2} - \sigma(\tilde{u}^{[t-1]}) \right) \right]$$

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
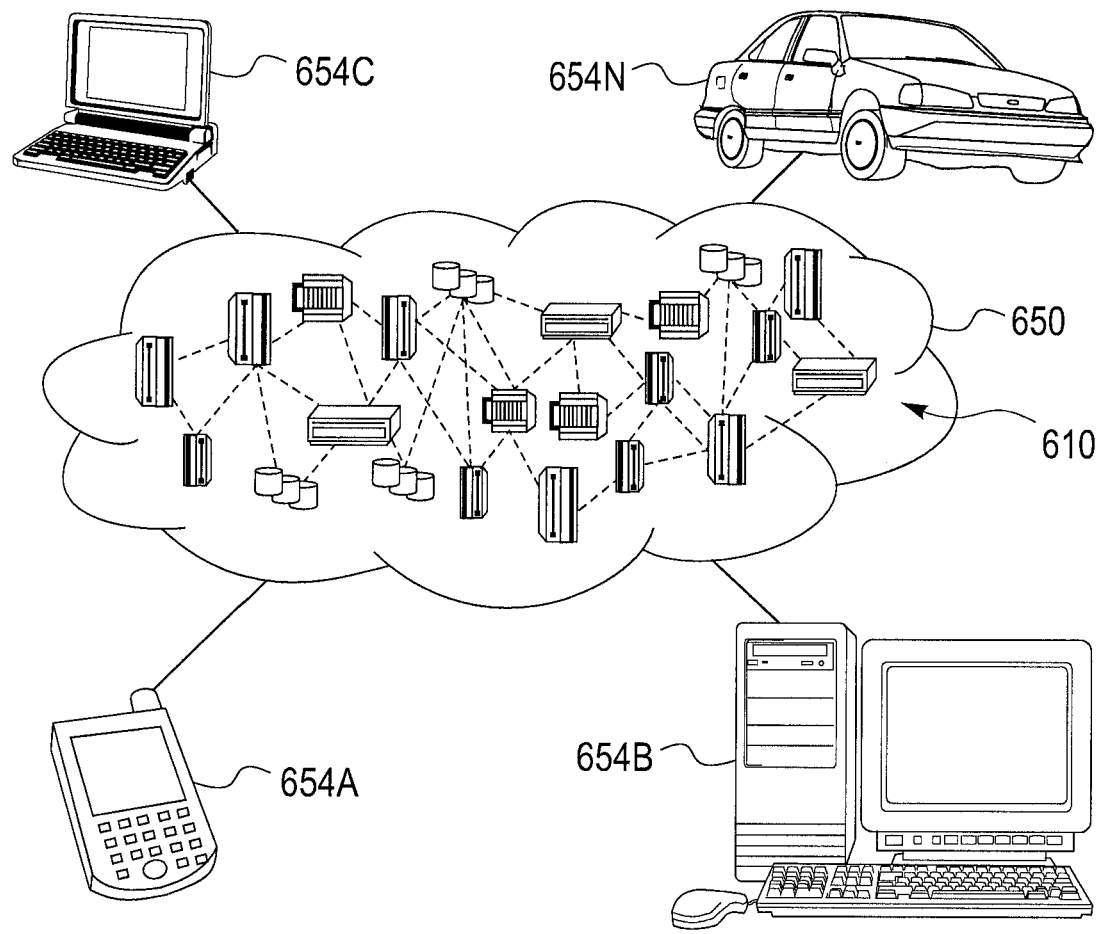
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
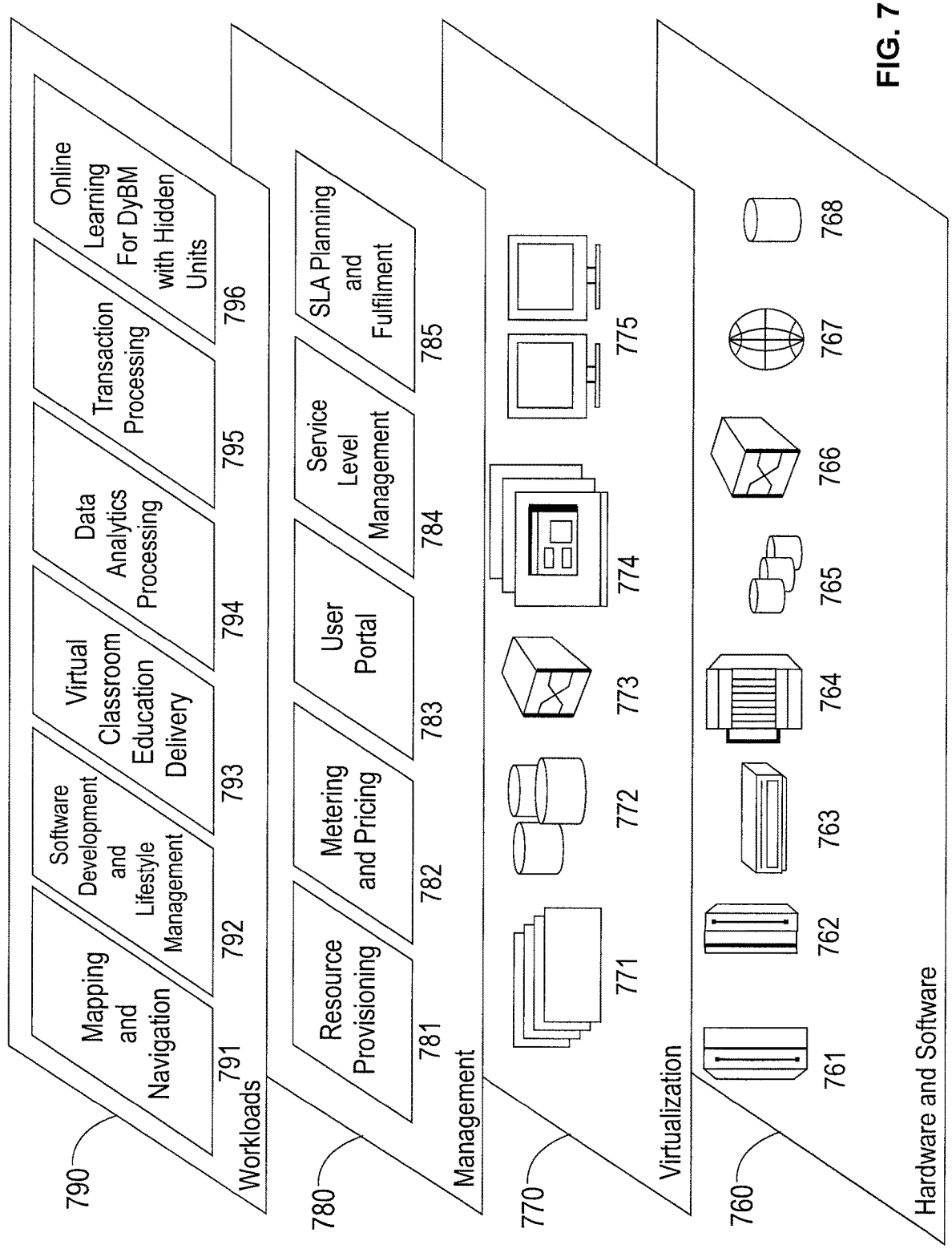
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and online learning for DyBM with hidden units 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for online learning for a Dynamic Boltzmann Machine (DyBM) with hidden units, comprising:
    imposing, by a processor device, limited connections in the DyBM where (i) a current observation depends only on an immediately preceeding two latest hidden units of a same layer connected to each other and all previous sequentially connected observations and (ii) the immediately preceding two latest hidden units depend on all the previous sequentially connected observations while lacking any connection with prior sequential hidden units situated directly before the immediately preceding two latest hidden units;
    computing, by the processor device, gradients of an objective function of the DyBM; and
    optimizing, by the processor device, the objective function in polynomial time with respect to the limited connections using a stochastic Gradient Descent algorithm applied to the gradients to provide a trained DyBM.

2. The computer-implemented method of claim 1, wherein said computing step computes the gradients of the objective function in a polynomial time.

3. The computer-implemented method of claim 1, wherein said computing step uses an exact, non-estimated gradient calculation technique to calculate the gradients.

4. The computer-implemented method of claim 1, wherein aid imposing step comprises unidirectionally training the DyBM.

5. The computer-implemented method of claim 4, wherein previous training data is discarded and unused for subsequent training.

6. The computer-implemented method of claim 1, wherein the latest units are employed as a non-linear transformation of the previous observations.

7. The computer-implemented method of claim 1, wherein the objective function is configured to maximize a log likelihood of a hidden vector being activated given an input vector.

8. The computer-implemented method of claim 7, wherein the objective function corresponds to a lower bound of the log-likelihood.

9. The computer-implemented method of claim 1, wherein the DyBM is incorporated into a computer processing device to predict an impending component failure therein, and the method further comprises maintaining processing continuity of the computer processing device by bypassing a component associated with the failure and enabling a replacement component in place of the component associated with the failure.

10. A computer program product for online learning for a Dynamic Boltzmann Machine (DyBM) with hidden units, the computer program product comprising a non-transitory computer readable storage medium having program instructions embodied therewith, the program instructions executable by a computer to cause the computer to perform a method comprising:
  imposing, by a processor device, limited connections in the DyBM where (i) a current observation depends only on an immediately preceding two latest hidden units of a same layer connected to each other and all previous sequentially connected observations and (ii) the immediately preceding two latest hidden units depend on all the previous sequentially connected observations while lacking any connection with prior sequential hidden units situated directly before the immediately preceding two latest hidden units;
  computing, by the processor device, gradients of an objective function of the DyBM; and
  optimizing, by the processor device, the objective function in polynomial time with respect to the limited connections using a stochastic Gradient Descent algorithm applied to the gradients to provide a trained DyBM.

11. The computer program product of claim 10, wherein said computing step computes the gradients of the objective function in a polynomial time.

12. The computer program product of claim 10, wherein said computing step uses an exact, non-estimated gradient calculation technique to calculate the gradients.

13. The computer program product of claim 10, wherein said imposing step comprises unidirectionally training the DyBM.

14. The computer program product of claim 13, wherein previous training data is discarded and unused for subsequent training.

15. The computer program product of claim 10, wherein the latest units are employed as a non-linear transformation of the previous observations.

16. The computer program product of claim 10, wherein the objective function is configured to maximize a log likelihood of a hidden vector being activated given an input vector.

17. The computer program product of claim 16, wherein the objective function corresponds to a lower bound of the log-likelihood.

18. The computer program product of claim 10, wherein the DyBM is incorporated into a computer processing device to predict an impending component failure therein, and the method further comprises maintaining processing continuity of the computer processing device by bypassing a component associated with the failure and enabling a replacement component in place of the component associated with the failure.

19. A computer processing system for online learning for a Dynamic Boltzmann Machine (DyBM) with hidden units, comprising:
  a memory for storing program code; and
  a processor device for running the program code to
    impose limited connections in the DyBM where (i) a current observation depends on an immediately preceding two latest hidden units of a same layer connected to each other and all previous sequentially connected observations and (ii) the immediately preceding two latest hidden units depend on all the previous sequentially connected observations while lacking any connection with prior sequential hidden units situated directly before the immediately preceding two latest hidden units;
    compute gradients of an objective function of the DyBM; and
    optimize the objective function in polynomial time with respect to the limited connections using a stochastic Gradient Descent algorithm applied to the gradients, to provide a trained DyBM.

20. The computer processing system of claim 19, wherein the DyBM is incorporated into a computer processing device to predict an impeding component failure therein, and the method further comprises maintaining processing continuity of the computer processing device by bypassing a component associated with the failure and enabling a replacement component in place of the component associated with the failure.

* * * * *